Oct. 1, 1957
C. F. MUELLER ET AL
2,808,374
OZONE GENERATOR
Filed Jan. 4, 1954
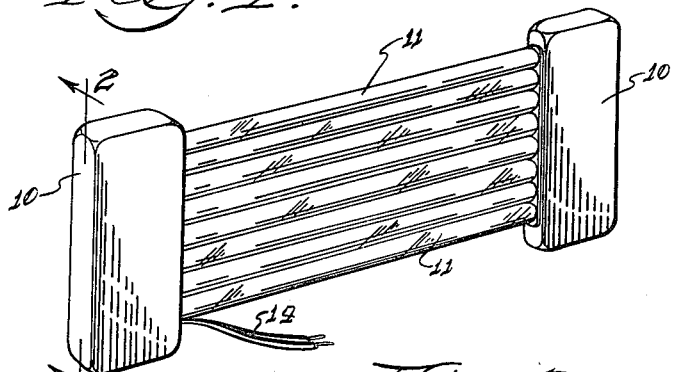
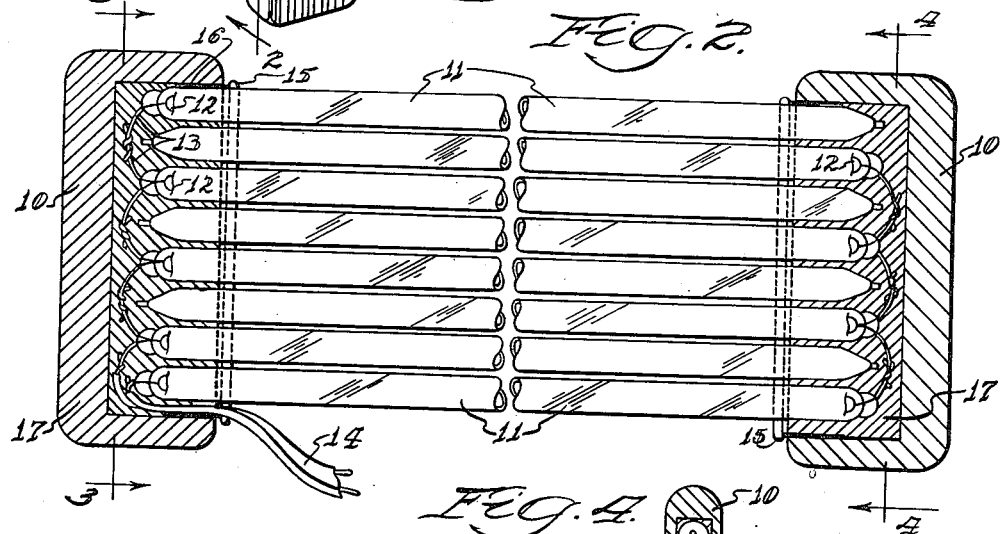
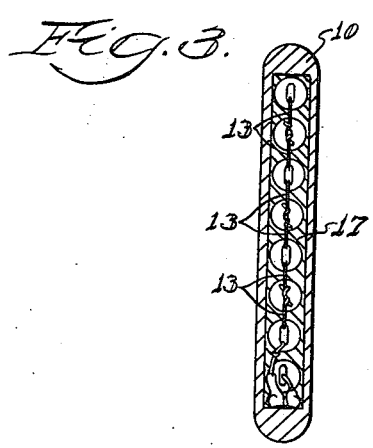
Inventors:
Earl F. Mueller
and Walter H. Mueller.
By Robert C. Comstock
Atty.

2,808,374

OZONE GENERATOR

Carl Fred Mueller and Walter A. Mueller, Los Angeles, Calif.

Application January 4, 1954, Serial No. 402,042

3 Claims. (Cl. 204—313)

This invention relates to an ozone generator and more particularly to such a device in which ozone is generated by electrical inter-action between a plurality of parallel tubes.

In the past, such devices have been constructed and their efficiency has been found to depend in large part upon the preciseness of the spacing between the tubes. The reason for this is that if the tubes are closer together at one end than the other, there will be more electrical discharge or arcing between the tubes taking place at the point where the tubes are closest because the resistance of the dielectric is low. On the other hand, the arcing and ozone generation will be retarded or prevented where the tubes are spaced farther apart because the resistance between the tubes is increased.

Various solutions to this problem have been sought, but none has previously been found to be satisfactory because the tubes are either not properly aligned or, also once aligned, do not retain their alignment.

It is an object of our invention to provide an ozone generator in which perfect spacing of the parallel tubes is provided and maintained at all times, resulting in maximum efficiency in the production of ozone.

It is a related object of our invention to provide such a device in which the electrical connections to the tubes are insulated and protected from moisture simultaneously and through the same means which provides the spacing of the tubes.

It is a further object of our invention to provide such a device in which the same spacing and insulating means also serve as a resilient mounting for the glass tubes to prevent their breakage.

It is another object of our invention to provide an ozone generator in which the wires leading from the transformer to the tubes are connected to only one side of the bank of tubes instead of both sides, thus providing less interference with the use of our device.

It is a related object of our invention to provide such a device in which the positioning of the electrodes in the tubes is alternated, so that the electrodes are spaced farther apart from each other to provide maximum insulation.

Our invention also comprises such other objects, advantages and capabilities as will later more fully appear and which are inherently possessed by our invention.

While we have shown in the accompanying drawings and described herein a preferred embodiment of our invention, it should be understood that the same is susceptible of modification and change without departing from the spirit of our invention.

Referring to the drawings, Fig. 1 is a perspective view of our ozone generator;

Fig. 2 is a side sectional view of the same taken on line 2—2 of Fig. 1;

Fig. 3 is a sectional view over one end of the same taken on line 3—3 of Fig. 2;

Fig. 4 is a sectional view of the other end of the same taken on line 4—4 of Fig. 2.

A preferred embodiment which has been selected to illustrate our invention comprises a pair of end members 10, which are preferably formed of molded plastic, although any other suitable material may be used. A plurality of glass tubes 11 which are formed of lead glass or other suitable material extend parallel to each other and transversely to the end members 10. The ends of the glass tubes 11 are mounted within the oppositely disposed end members 10. Each of the tubes 11 except the bottom tube is provided at one end with an electrode 12. The bottom tube 11 has an electrode 12 at each end. Extending from each of the electrodes 12 out of one end of the tube 11 is a pair of electrical wires 13, which are customarily bare of insulation. The end of each tube 11 which does not contain an electrode 12 is sealed off.

The tubes 11 are arranged to alternate the positioning of the electrodes 12 so that except for the bottom left-hand corner of the assembly, all of the electrodes 12 are spaced from each other by a sealed off end of a tube 11 which does not contain an electrode. This provides a maximum amount of spacing and insulation between the electrodes 12.

Electrical current for the operation of our ozone generator is provided from a suitable high voltage transformer which is not shown in the drawing, but which may be a 9,000 volt, 18 milliampere transformer or any other suitable transformer. The current flows through a pair of electrical wires 14, the ends of which are connected to the electrodes of the bottom two tubes 11. The other electrodes 12 within one end member 10 are connected to the bottom tube. The other electrodes 12 within the opposite end member 10 are connected to the tube which is next to the bottom tube.

The glass tubes 11 are filled with gas, which may be any suitable kind. In one embodiment of the invention, half of the tubes are filled with red neon gas, which provides a slight red glow in use, while the alternate tubes are filled with a mixture of argon, neon and mercury, which provides a slight blue glow in use.

In the construction of our ozone generator, the glass tubes 11 are mounted in a precision jig whch provides perfect spacing and alignment. The electrical connections are made before the ends of the tubes are inserted into the end members 10. A band 15, which is preferably formed of a resilient plastic material such as polyethylene is passed around each end of the assembled tubes 11 and is held in place by a strip of tape 16.

Each of the end members 10 is half filled with a molten filler 17, which is preferably formed from a material having resilience and a relatively low coefficient of heat expansion. It has been found that polyethylene plastic is suitable for this purpose. Pitch has also been used and is satisfactory except at low temperatures, when it tends to harden and lose its resilience.

The ends of the assembled tubes 11 are placed within the end members 10. The filler 17, which is in a heated molten state, moves into the area surrounding the ends of the tubes 11, the wires 13 and the ends of the wires 14. It enters the spaces between the tubes 11 themselves and between the tubes 11 and the end member 10. When the filler 17 hardens, it provides a spacer which holds the tubes 11 precisely parallel to each other. It also serves as an insulator for the wires 13 and 14 and seals off the wires and electrodes to prevent any moisture from reaching them. The filler 17 further provides a resilient mounting for the glass tubes 11 to prevent their breakage.

The top edge of the band 15 is rolled over to provide a finished appearance for the end members 10 and to provide further resilience between the glass tubes 11 and the top edge of the end members 10.

In operation, the electrodes 12 are energized from the transformer and alternating current flows through the tubes 11. The difference of potential between the tube surfaces is such that a considerable amount of corona or arc discharge takes place between the surfaces of the tubes. This results in the liberation of ozone from the air surrounding the tubes 11.

It may be noted that ozone is highly corrosive and that the electrical wires of the electrodes are best protected from such corrosive effects if they are completely sealed off from the ozone in the manner prescribed by our invention.

We claim:

1. An ozone generator comprising a bank of gas filled tubes, said tubes extending substantially parallel to each other, each of said tubes having an electrode disposed adjacent one end thereof and an electrical wire connected to said electrode and protruding from the adjacent end of said tube, a pair of end members, the ends of said tubes including said wires being disposed within said end members, a dielectric material within said end members, said dielectric material having a molten state when heated and a solid state with resilient properties at lower temperatures, said dielectric material being adapted to hold the ends of said tubes within said end members parallel to each other for maximum generation of ozone, said dielectric material surrounding said electrical wires to insulate them, said dielectric material having resilient properties serving to prevent breakage of said tubes, the bottom tube of said bank having an electrode at each end thereof with an electrical wire connected to each of said electrodes and protruding from the adjacent end of said tube, said tubes being arranged so that their electrodes are oppositely disposed from each other, the wires within each of said end members being connected to each other, and a pair of input wires extending into one of said end members, one of said input wires being connected to one of the wires of said bottom tube, and the other of said input wires being connected to the remaining wires within said end member.

2. An ozone generator comprising a bank of gas filled tubes, said tubes extending substantially parallel to each other, each of said tubes having an electrode disposed adjacent one end thereof and an electrical wire connected to said electrode and protruding from the adjacent end of said tube, a pair of end members, the ends of said tubes including said wires being disposed within said end members, the bottom tube of said bank having an electrode at each end thereof with an electrical wire connected to each of said electrodes and protruding from the adjacent end of said tube, said tubes being arranged so that their electrodes are oppositely disposed from each other, the wires within each of said end members being connected to each other, and a pair of input wires extending into one of said end members, one of said input members being connected to one of the wires of said bottom tube and the other of said input wires being connected to the remaining wires within said end member.

3. An ozone generator comprising a bank of gas filled tubes, said tubes extending parallel to each other, each of said tubes having an electrode and a pair of electrical wires connected to said electrode and protruding from one end of said tube, a pair of end members, the ends of said tubes being disposed within said end members, polyethylene dielectric material within said end members, said dielectric material having a molten state when heated and a solid state with resilient properties at lower temperatures, said dielectric material being adapted to hold the ends of said tubes within said end members precisely parallel to each other for maximum generation of ozone, said dielectric material surrounding said electrical wires to insulate them, said dielectric material having resilient propertes serving to prevent breakage of said tubes.

References Cited in the file of this patent

UNITED STATES PATENTS

| 898,506 | Quain | Sept. 15, 1908 |
| 1,864,174 | Davis | June 21, 1932 |
| 2,189,279 | Bitner | Feb. 6, 1940 |
| 2,328,640 | Gage | Sept. 7, 1943 |

FOREIGN PATENTS

| 19,669 | France | Feb. 17, 1915 |